United States Patent

Konno et al.

[11] Patent Number: 6,064,130
[45] Date of Patent: May 16, 2000

[54] MOTOR HAVING DYNAMIC PRESSURE BEARING, AND ROTATOR DEVICE HAVING THE MOTOR AS DRIVING SOURCE

[75] Inventors: Katsushige Konno; Shinichi Hayashizaki, both of Narashino, Japan

[73] Assignee: Seiko Instruments Inc., Japan

[21] Appl. No.: 09/166,652

[22] Filed: Oct. 5, 1998

[51] Int. Cl.[7] .............................. H02K 5/16; G02B 26/08
[52] U.S. Cl. ............................ 310/90; 310/67 R; 384/99; 384/100; 384/107; 359/200; 359/198; 359/216; 359/217
[58] Field of Search ..................................... 310/67 R, 90, 310/90.5; 384/100, 107, 111–115, 120, 123; 360/98.07, 99.04, 99.08; 359/200, 217, 855, 198, 216, 871, 872

[56] References Cited

U.S. PATENT DOCUMENTS

| | | | |
|---|---|---|---|
| 4,805,972 | 2/1989 | Tanaka et al. | 350/6.7 |
| 4,883,367 | 11/1989 | Maruyama | 384/114 |
| 4,984,881 | 1/1991 | Osada et al. | 350/616 |
| 5,018,881 | 5/1991 | Asada | 384/113 |
| 5,097,164 | 3/1992 | Nakasugi et al. | 310/88 |
| 5,596,443 | 1/1997 | Konno et al. | 359/200 |
| 5,658,080 | 8/1997 | Ichiyama | 384/112 |
| 5,710,470 | 1/1998 | Komata et al. | 310/90.5 |
| 5,847,479 | 12/1998 | Wang et al. | 310/90 |

*Primary Examiner*—Nestor Ramirez
*Assistant Examiner*—Tran N Nguyen
*Attorney, Agent, or Firm*—Adams & Wilks

[57] ABSTRACT

A dynamic pressure bearing having a reduced manufacturing time and cost is produced using a single dynamic pressure generating groove. A motor having a dynamic pressure bearing according to one embodiment of the present invention includes a supporting body, a stator coil mounted to the supporting body, a rotor having opposing upper and lower surfaces, a rotor magnet for generating a rotational force in cooperation with the stator coil, the rotor magnet being attached to one of the upper and lower surfaces of the rotor so as to oppose the stator, a fixed shaft forming a dynamic pressure bearing mounted to the supporting body, and a disc-shaped lower thrust cap member attached to the supporting body proximate the lower surface of the rotor. The rotor has an inner peripheral surface defining a hole through which the fixed shaft passes. The upper and lower surfaces of the rotor and an upper surface of the lower thrust cap member are formed without any dynamic pressure generating grooves, a spiral groove is formed in one of the outer circumferential surface of the fixed shaft and the inner peripheral surface of the rotor, and the other one of the outer circumferential surface of the fixed shaft and the inner peripheral surface of the rotor is formed without any dynamic pressure generating grooves. In a particularly preferred embodiment, the spiral groove is formed in the outer circumferential surface of the fixed shaft.

19 Claims, 2 Drawing Sheets

MOTOR HAVING DYNAMIC PRESSURE BEARING, AND ROTATOR DEVICE HAVING THE MOTOR AS DRIVING SOURCE

BACKGROUND OF THE INVENTION

The present invention relates to a motor having a dynamic pressure bearing and a rotator device having a rotator which is driven by the motor.

In the typical motor having a dynamic pressure bearing and the typical rotator device having a rotator which is driven by the motor, metal material such as aluminum alloy, ceramic material, and two kinds of metal material and ceramic material are used for the dynamic pressure bearing. Although there are a radial dynamic pressure bearing and a thrust dynamic bearing in the dynamic pressure bearing, they are usually adopted at the same time. There are many rotator devices in which rotator thereof is driven by the which conventional bearing. An example is described in Japanese Opened Patent No. 63-241516. As shown in FIG. 2, the rotator device disclosed in the Japanese patent is a polygon mirror device having a polygon rotor in which a rotator 3 having mirror surface 2 is rotatably formed at a fixed shaft 5 formed at a supporting body 4, wherein said rotator 3, the supporting body 4, and the fixed shaft 5 fixed at the supporting body 4 are made of ceramic material, and grooves 11 for generating dynamic pressure are formed at any sliding surface formed facing said supporting body 4 and/or fixed shaft 5.

The grooves for generating dynamic pressure include a groove for generating radial dynamic pressure and a groove for generating thrust dynamic pressure: the former is a herringbone groove G1 formed at either of inner circumferential surface of a penetration hole in the rotator 3 through which the fixed shaft 5 is inserted or the outer circumferential surface of the fixed shaft 5, as shown in FIG. 3; and the latter is a spiral groove G2 formed at either of the lower surface of the rotator 3 and the lower surface of the supporting body 4 facing under surface of the rotor. Although the groove for generating dynamic pressure is formed at dynamic pressure bearing member of ceramic material using shot blast, the processing is not easy. Using NC processing or deformation processing by ball form rolling, Herringbone groove and spiral groove are usually processed at dynamic pressure bearing member of soft metal such as copper alloy or aluminum alloy. These processes too are not easy and involving significant time and labor.

An object of the present invention is to provide a dynamic pressure bearing having a structure in which a groove for generating dynamic pressure is worked easy in the motor having dynamic pressure hearing and the rotator device having the motor as a driving source.

SUMMARY OF THE INVENTION

The present invention provides a motor having a dynamic pressure bearing, the motor comprising a supporting body at which a stator coil is arranged, a rotor at which a rotor magnet for generating a rotational force cooperating with the stator coil is arranged, and a dynamic pressure bearing rotatably supporting the rotor at said supporting body, and further comprising: a fixed shaft forming said dynamic pressure bearing at said supporting body; a cylindrical body at which said rotor is attached, the cylindrical body having a penetration hole into which said fixed shaft is inserted and being thicker than the rotor; and a disc shaped lower thrust cap member attached at said supporting body near the lower end surface of said cylindrical body, wherein upper end and lower end surfaces, an inner circumferential surface of the penetration hole, and a lower surface of said under thrust cap member have flat surfaces, and a spiral groove is formed at the outer circumference surface of said fixed shaft. By forming the dynamic pressure bearing by the above-mentioned structure, the above-mentioned problem is solved.

DETAILED DESCRIPTION OF THE PREFERRED EMBODIMENTS

Figure 1:
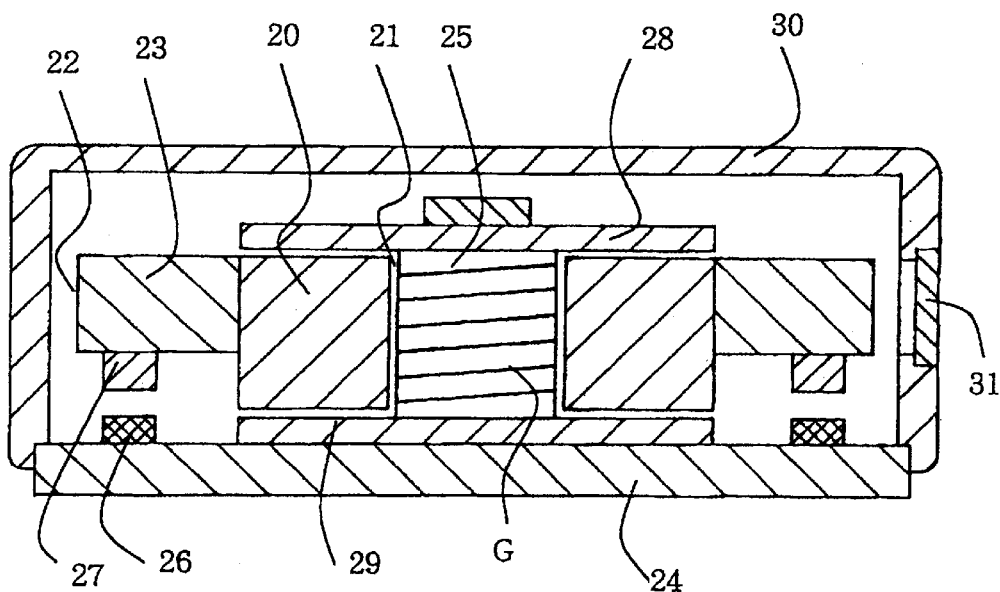
FIG. 1 is a longitudinal view of a polygon mirror of an embodiment according to the present invention.
Figure 2:
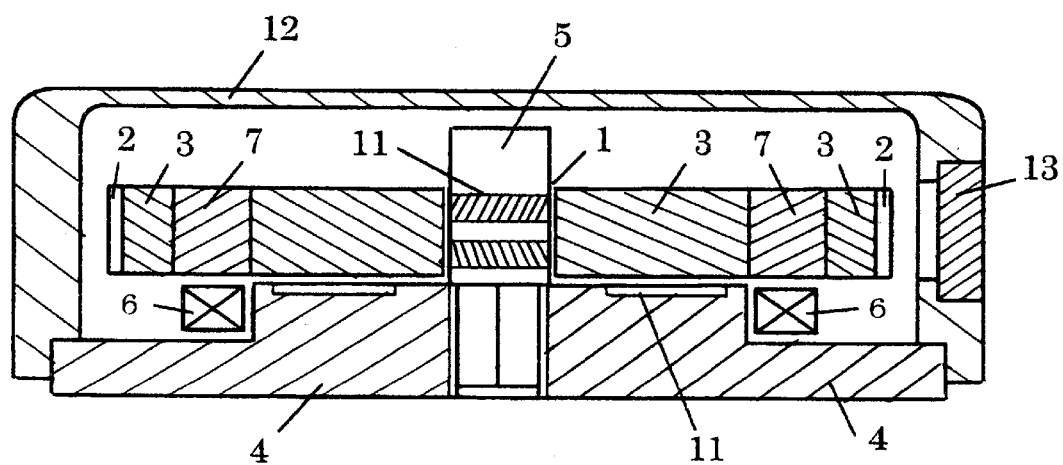
FIG. 2 is a longitudinal view of the conventional polygon mirror.

FIG. 1 is a longitudinal sectional view of an embodiment of a polygon mirror device according to the present invention, and a polygon rotor comprises a cylindrical body 20 and a polygon mirror 23. The cylindrical body 20 is a thick cylindrical body and has a peretration hole 21 at a center portion thereof. A fixed shaft 25 formed at a supporting body 24 is inserted in the penetration hole 21. The polygon mirror 23 is a rotator having a regular polygon cross section and a rectangular or substantially rectangular longitudinal section. The polygon mirror 23 has an attaching hole inserted onto the cylindrical body 20 at a center thereof so as to function as one body polygon rotor. A mirror surface 22 is formed at the outer circumferential surface of the polygon mirror 23 using polishing or the like. A rotor magnet 27 is attached at the lower surface proximate the outer circumference of the polygon mirror 23. A stator coil 26 for generating a rotational force in cooperation with the rotor magnet 27 is attached at the supporting body 24 and arranged at a position facing the rotor magnet 27. A disc shaped upper thrust cap member 28 is attached at the upper end of the fixed shaft, and similarly, a disc shaped the lower thrust cap member 29 is attached at the lower end of the fixed shaft. Symbol 30 is a cover of the rotator device and symbol 31 is a window for incidence and reflection of laser. The cylindrical body 20, the polygon mirror 23, the fixed shaft 25, and the upper and under thrust cap members 28 and 29 are made of copper alloy or aluminum alloy.

Figure 3:
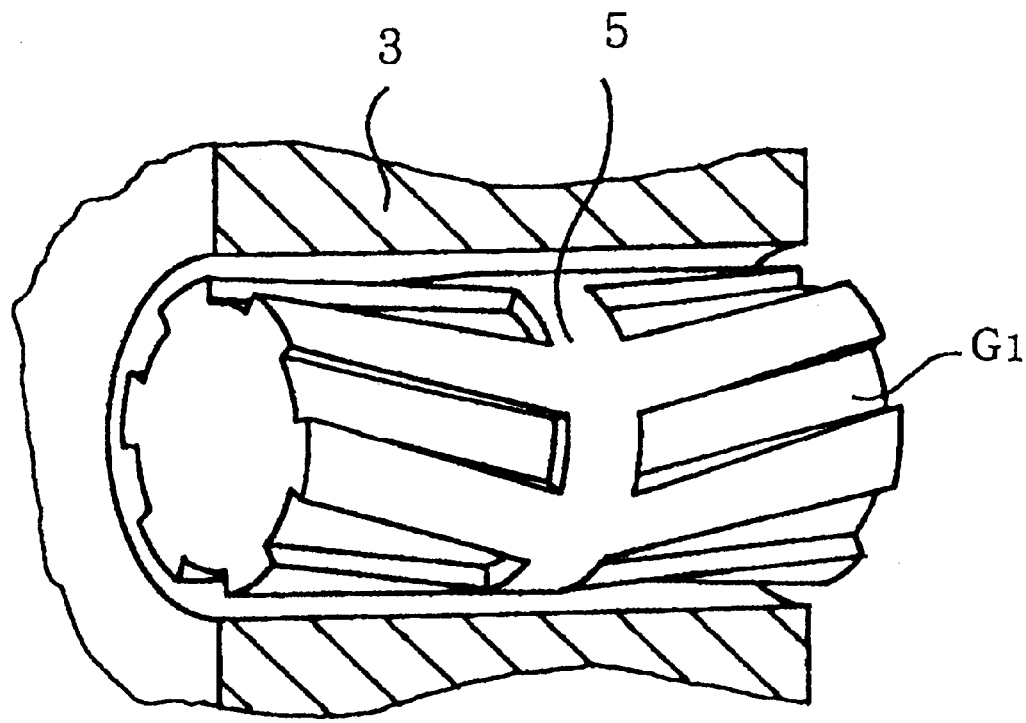
FIG. 3 is a view of an example of a groove for generating radial dynamic pressure.
Figure 4:
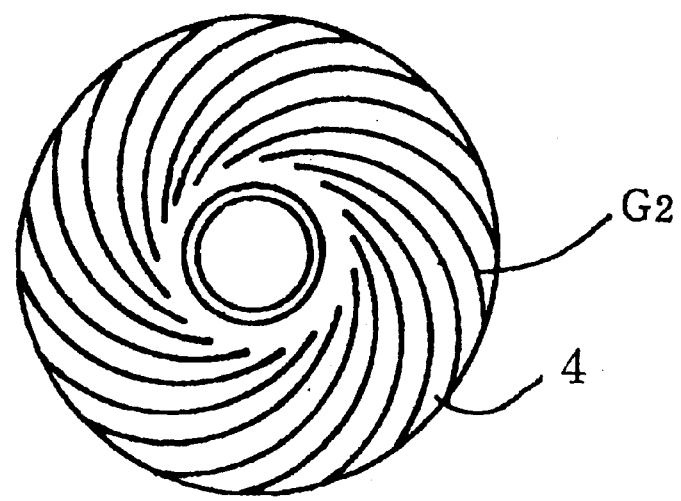
FIG. 4 is a view of an example of a groove for generating thrust dynamic pressure.

The groove for generating radial dynamic pressure is a spiral groove G and is formed at the outer circumferential surface of the fixed shaft 25. The portion of inner circumferential surface of the penetration hole 21 of the cylindrical body 20 opposing with the outer circumferential surface of fixed shaft 25 is a flat surface. Similarly, the upper surface of the penetration hole 21 constructing a thrust dynamic pressure bearing portion, the under surface of the disc shaped upper thrust cap member 28, the under surface of the cylindrical body 20, and upper surface of disc shaped under thrust cap members 29 are all flat surfaces. To sum up, a complex groove for generating dynamic pressure such as the herringbone groove G1 of FIG. 3 is not formed at the radial dynamic pressure bearing portion and a complex groove for generating dynamic pressure such as the spiral groove G2 of FIG. 4 is not formed at the thrust dynamic pressure bearing. Instead, only a spiral groove G is formed at the radial dynamic pressure bearing portion in the present invention.

In FIG. 1, when the motor starts and rotates at a high speed in a clockwise direction, dynamic air generated by the spiral groove G formed at the outer circumferential surface of the fixed shaft 25 moves through a narrow gap of several micron meter between the flat under end surface of the cylindrical body 20 and the flat surface of the disc shaped lower thrust cap member 29 at the lower end portion of the fixed shaft 25, and at the upper end of the fixed shaft 25, the dynamic air moves through a narrow gap of several microns between the flat upper end surface of the cylindrical body 20 and the flat lower surface of the disc shaped upper thrust cap member 28. Therefore, the narrow gap of several microns is kept during high speed rotation of the motor. Namely the upper surface of the cylindrical body 20, lower surface of the disc shaped upper thrust cap member 28, the lower surface of the cylindrical body 20, and the disc shaped lower thrust cap member 29 function respectively as the lower and under thrust dynamic pressure bearings. Therefore, the polygon rotor having rested touching the upper surface of the disc shaped lower thrust cap member 29, that is, the sliding surface (member comprising the cylindrical body 20 and the polygon mirror 23) rises a little, i.e., several microns, so as to mantain smooth and stable high speed rotation keeping the position balancing with empty weight of the polygon rotor.

In FIG. 1, although the polygon mirror 23 is made of copper alloy or aluminum alloy, it may be made of ceramic. The upper and under thrust cap members 28 and 29 may be made of ceramic. Further in the construction of FIG. 1, the upper thrust cap member 28 is not always needed.

The present invention provides a rotator device having a motor as a driving source having dynamic pressure bearing comprising a supporting body at which a stator coil is arranged, a rotor at which a rotor magnet for generating a rotation force cooperating with the stator coil is arranged, and a dynamic pressure bearing rotatably supporting the rotor at said supporting body, the rotator device comprising a rotator fixed by said rotor and driven by the motor, further comprising: a fixed shaft forming said dynamic pressure bearing at said supporting body; a cylindrical body at which said rotor is attached, the cylindrical body having a penetration hole into which said fixed shaft is inserted and being thicker than the rotor; and a lower thrust cap member attached at said supporting body near the lower end surface of said cylindrical body, wherein a spiral groove is formed at the outer circumferential surface of said fixed shaft, and other sliding surfaces of the dynamic pressure bearing are all made flat surface. Therefore, the manufacturing process for producing the dynamic pressure bearing is sharply decreased, and manufacturing cost of the motor and the rotator device having the motor as driving source can be decreased.

What is claimed is:

1. A motor having a dynamic pressure bearing, the motor comprising: a supporting body; a stator coil mounted to the supporting body; a rotor having opposing upper and lower surfaces defining a thickness therebetween, and having an inner peripheral surface; a rotor magnet for generating a rotational force in cooperation with the stator coil, the rotor magnet being attached to one of the upper and lower surfaces of the rotor so as to oppose the stator; a dynamic pressure bearing rotatably supporting the rotor with respect to the supporting body; a fixed shaft forming the dynamic pressure bearing mounted to the supporting body; a cylindrical body to which the rotor is attached, the cylindrical body having opposing upper and lower surfaces defining a thickness therebetween and having an inner peripheral surface defining a central penetration hole into which the fixed shaft is inserted and an outer peripheral surface which is attached to the inner peripheral surface of the rotor, the thickness of the cylindrical body being larger than that of the rotor; and a disc shaped lower thrust cap member attached at the supporting body proximate the lower surface of the cylindrical body; wherein the upper and lower surfaces of the cylindrical body, the inner peripheral surface of the cylindrical body, and an upper surface of the lower thrust cap member are formed without any dynamic pressure generating grooves, and a groove is formed at an outer circumferential surface of the fixed shaft.

2. A motor according to claim 1; further comprising a disc shaped upper thrust cap member attached to an upper portion of the fixed shaft and having a lower surface facing the upper surface of the cylindrical body, the lower surface of the upper thrust cap member having no dynamic pressure generating grooves formed therein.

3. A motor according to claim 1; wherein the groove is a spiral groove.

4. A rotator device having a motor as a driving source, the rotator device comprising: a supporting body; a stator coil mounted to the supporting body; a rotor having opposing upper and lower surfaces defining a thickness therebetween, and having an inner peripheral surface; a rotor magnet for generating a rotational force in cooperation with the stator coil, the rotor magnet being attached to one of the upper and lower surfaces of the rotor so as to oppose the stator; a dynamic pressure bearing rotatably supporting the rotor with respect to the supporting body, a rotator fixed to the rotor and driven by the motor; a fixed shaft forming the dynamic pressure bearing mounted to the supporting body; a cylindrical body to which the rotor is attached, the cylindrical body having opposing upper and lower surfaces defining a thickness therebetween and having an inner peripheral surface defining a central penetration hole into which the fixed shaft is inserted and an outer peripheral surface which is attached to the inner peripheral surface of the rotor, the thickness of the cylindrical body being larder than that of the rotor; and a disc shaped lower thrust cap member attached at the supporting body proximate the lower surface of the cylindrical body; wherein the upper and lower surfaces of the cylindrical body, the inner peripheral surface of the cylindrical body, and an upper surface of the lower thrust cap member are formed without any dynamic pressure generating grooves, and a groove is formed at an outer circumferential surface of the fixed shaft.

5. A rotator device according to claim 4; further comprising a disc shaped upper thrust cap member attached to an upper portion of the fixed shaft and having a lower surface facing the upper surface of the cylindrical body, the lower surface of the upper thrust cap member having no dynamic pressure generating grooves formed therein.

6. A rotator device according to claim 4; wherein the rotator comprises a polygon mirror.

7. A rotator device according to claim 4; wherein the groove is a spiral groove.

8. A motor comprising: a supporting body; a stator coil mounted to the supporting body; a rotor; a rotor magnet for generating a rotational force in cooperation with the stator coil, the rotor magnet being attached to the rotor; a dynamic pressure bearing formed at the supporting body; a fixed shaft forming the dynamic pressure bearing for rotatably supporting the rotor with respect to the supporting body; a cylindrical body having a penetration hole into which the fixed shaft is inserted, wherein the cylindrical body has a first upper surface and a first lower surface and the hole has an inner circumferential surface facing the fixed shaft; and a disc-shaped lower thrust cap member attached to the supporting body, the disc-shaped lower thrust cap member having a second upper surface and a second lower surface; wherein the first upper surface, the first lower surface, the inner circumferential surface, the second upper surface and the second lower surface are formed without any dynamic pressure generating grooves, and a groove is formed at the outer circumferential surface of the fixed shaft.

9. A motor according to claim 8; wherein the groove is a spiral groove.

10. A motor according to claim 8; further comprising a disc shaped upper thrust cap member attached to an upper portion of the fixed shaft and having a lower surface facing the upper surface of the cylindrical body, the lower surface of the upper thrust cap member having no dynamic pressure generating grooves formed therein.

11. A rotator device having a motor as a driving source, the rotator device comprising: a supporting body; a stator coil mounted to the supporting body; a rotor; a rotor magnet for generating a rotational force in cooperation with the stator coil, the rotor magnet being attached to the rotor; a dynamic pressure bearing for rotatably supporting the rotor with respect to the supporting body; a rotator fixed to the rotor and driven by the motor; a fixed shaft forming the dynamic pressure bearing at the supporting body; a cylindrical body having a penetration hole into which the fixed shaft is inserted, wherein the cylindrical body has a first upper surface and a first lower surface and the hole has an inner circumferential surface facing the fixed shaft; and a disc-shaped lower thrust cap member attached to the supporting body, the disc-shaped lower thrust cap member having a second upper surface and a second lower surface; wherein the first upper surface, the first lower surface, the inner circumferential surface, the second upper surface and the second lower surface are formed without any dynamic pressure generating grooves, and a groove is formed at the outer circumferential surface of the fixed shaft.

12. A rotator device according to claim 11; wherein the groove is a spiral groove.

13. A rotator device according to claim 11; further comprising a disc shaped upper thrust cap member attached to an upper portion of the fixed shaft and having a lower surface facing the upper surface of the cylindrical body, the lower surface of the upper thrust cap member having no dynamic pressure generating grooves formed therein.

14. A rotator device according to claim 11; wherein the rotator comprises a polygon mirror.

15. A motor having a dynamic pressure bearing, the motor comprising: a supporting body; a stator coil mounted to the supporting body; a rotor having opposing upper and lower surfaces; a rotor magnet for generating a rotational force in cooperation with the stator coil, the rotor magnet being attached to one of the upper and lower surfaces of the rotor so as to oppose the stator; a fixed shaft forming a dynamic pressure bearing mounted to the supporting body; and a disc-shaped lower thrust cap member attached to the supporting body proximate the lower surface of the rotor; wherein the rotor has an inner peripheral surface defining a hole through which the fixed shaft passes, the upper and lower surfaces of the rotor and an upper surface of the lower thrust cap member are formed without any dynamic pressure generating grooves, a groove is formed in the outer circumferential surface of the fixed shaft.

16. A motor according to claim 15; wherein the groove is a spiral groove.

17. A motor according to claim 15; further comprising a disc-shaped upper thrust cap member attached to an upper portion of the fixed shaft and having a lower surface facing the upper surface of the rotor, the lower surface of the upper thrust cap member having no dynamic pressure generating grooves formed therein.

18. A motor according to claim 17; wherein the rotor comprises a rotating member having opposing upper and lower surfaces defining a thickness therebetween, and having an inner peripheral surface, and a cylindrical body to which the rotating member is attached, the cylindrical body having opposing upper and lower surfaces defining a thickness therebetween and having an inner peripheral surface defining a central penetration hole into which the fixed shaft is inserted and an outer peripheral surface which is attached to the inner peripheral surface of the rotating member.

19. A motor according to claim 17; wherein the inner peripheral surface of the cylindrical body defining the penetration hole is formed without any dynamic pressure generating grooves.

* * * * *